(12) United States Patent
Moilanen et al.

(10) Patent No.: US 7,280,831 B2
(45) Date of Patent: Oct. 9, 2007

(54) METHOD FOR IDENTIFICATION OF BASE STATIONS AND FOR CHECKING MEASUREMENT VALUES OF AN OBSERVED TIME DIFFERENCE BETWEEN TRANSMISSIONS FROM BASE STATIONS

(75) Inventors: Jani M. Moilanen, Helsinki (FI); Ville Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 159 days.

(21) Appl. No.: 10/250,459

(22) PCT Filed: Nov. 5, 2001

(86) PCT No.: PCT/EP01/12779

§ 371 (c)(1),
(2), (4) Date: Dec. 2, 2003

(87) PCT Pub. No.: WO03/041436

PCT Pub. Date: May 15, 2003

(65) Prior Publication Data

US 2004/0082344 A1    Apr. 29, 2004

(51) Int. Cl.
*H04Q 7/20* (2006.01)
*H04Q 7/38* (2006.01)

(52) U.S. Cl. ............... 455/436; 455/437; 455/438; 455/439; 455/422.1; 455/403; 455/432.1; 370/328; 370/329; 370/331; 370/332

(58) Field of Classification Search ........ 455/436–444, 455/422.1, 432.1, 432.2, 432.3, 434, 550.1, 455/561, 502, 500, 517, 524, 525, 67.11, 455/423, 424, 425, 456.1, 456.6, 445; 370/328, 370/329, 331, 332, 333, 334, 310
See application file for complete search history.

(56) References Cited

U.S. PATENT DOCUMENTS 5,534,876 A   7/1996 Erickson et al.

(Continued)

FOREIGN PATENT DOCUMENTS

EP    0 915 631 A2   5/1999

(Continued)

OTHER PUBLICATIONS

3GPP TS 05.10 v8.8.0 (Apr. 2001), "*3rd Generation Partnership Project; Technical Specification Group GSM/EDGE Radio Access Network; Digital Cellular Telecommunications System (Phase 2+); Radio Subsystem Synchronization (Release 1999)*", Global System for Mobile Communications.

(Continued)

*Primary Examiner*—Keith Ferguson
(74) *Attorney, Agent, or Firm*—Squire, Sanders & Dempsey L.L.P.

(57) ABSTRACT

A method for identification of transceiver devices in a radio communication network, includes the steps of pre-identifying transceiver devices, judging that there is an ambiguous result obtained in the pre-identification, and verifying the ambiguous result by identifying the transceiver devices based on real time difference (RTD) values between the transceiver devices. Also the method may include checking measurement values of an observed time difference (OTD) obtained at a mobile transceiver device operated within a radio communication network constituted by transceiver devices, wherein the checking is based on real time difference values between the transceiver devices. Thus, an improved method is obtained for mobile station location determination and/or for taking handover decisions as well as a way of verifying the reliability of obtained measurement results.

21 Claims, 3 Drawing Sheets

U.S. PATENT DOCUMENTS

| | | | |
|---|---|---|---|
| 6,181,682 B1 * | 1/2001 | Abbadessa et al. | 370/328 |
| 6,212,384 B1 * | 4/2001 | Almgren et al. | 455/446 |
| 6,356,763 B1 * | 3/2002 | Kangas et al. | 455/456.1 |
| 6,490,454 B1 * | 12/2002 | Kangas et al. | 455/456.1 |
| 6,957,072 B2 * | 10/2005 | Kangras et al. | 455/456.1 |

FOREIGN PATENT DOCUMENTS

| | | |
|---|---|---|
| WO | WO 00/08886 | 2/2000 |

OTHER PUBLICATIONS

3GPP TS 04.31 v8.6.0 (Sep. 2001), *3rd Generation Partnership Project; Technical Specification Group GSM Edge Radio Access Network; Location Services (LSC); Mobile Station (MS)-Serving Mobile Location Centre (SMLR) radio Resource LCS Protocol (RRLP) (Release 1999)*, Global System for Mobile Communications.

3GPP TS 03.71 v8.3.0 (Oct. 2001), *3rd Generation Partnership Project; Technical Specification Group and System Acpects; Digital Cellular Telecommunications System (Phase 2+); Location Services (LCS); (functional description)-Stage 2 (Release 1999)*, Global System for Mobile Communications.

Gunnarson et al, "Location Trial System for Mobile Phones", IEEE Globecom 1998, The Bridge to Global Integration. Sydney, Nov. 8-12, 1998., vol. 8, pp. 2211-2216.

* cited by examiner

METHOD FOR IDENTIFICATION OF BASE STATIONS AND FOR CHECKING MEASUREMENT VALUES OF AN OBSERVED TIME DIFFERENCE BETWEEN TRANSMISSIONS FROM BASE STATIONS

FIELD OF THE INVENTION

The present invention relates to a method for identification of transceiver devices and for checking measurement values of an observed time difference.

BACKGROUND OF THE INVENTION

Recently, development of communication networks and in particular of radio communication networks has made considerable progress. For example, the GSM network and its successors such as the GPRS and/or UMTS networks find increasing attention.

Basically, radio communication networks are constituted by transceiver devices also known as base transceiver stations BTS. A mobile transceiver station also known as mobile station MS (according to GSM) and/or user equipment UE (according to UMTS) communicates via the radio interface (air interface) with the transceiver devices constituting the network. Of course, the transceiver devices are controlled by other network elements of a higher hierarchy which, however, are omitted from the description in this case as this is considered to be not essential to the invention to be described.

Generally, a mobile station MS may move and/or roam within the radio communication network. In this connection, there may arise a situation in which a mobile station MS leaves the coverage area of a serving base transceiver station BTS and is handed over to a new base transceiver station BTS.

To this end, a knowledge of the transceiver stations surrounding the mobile station and/or a serving transceiver station is required in order to take a proper decision on where to handover the moving mobile station. Correspondingly, a knowledge of the mobile station's position within the network is required.

According to one principle, the required knowledge is obtained by measurements performed by e.g. the mobile station itself, which measures the observed time difference OTD between signals received at the mobile station from a pair of transceiver stations BTS, e.g. between a currently serving base transceiver station and a respective other base transceiver station.

This is known as OTD method and described in literature in detail. Briefly summarized, e.g. in GSM phase 2 systems, support for pseudo-synchronous handover is compulsory. In a pseudo-synchronous handover, the mobile station MS will keep the timing values for the surrounding base transceiver stations BTSs in order to be pre-synchronized to the new BTS upon handover. To obtain this synchronization, the MS must calculate and/or measure an Observed Time Difference (OTD) between signals received from the serving BTS and the other BTSs. Each BTS must maintain a Real Time Difference, RTD, between itself and a respective one of its neighboring base stations. When handover is performed, the RTD is supplied to the mobile station MS, which with the knowledge of the RTD and OTD can calculate the Timing Advance needed to synchronize with the new BTS, and go directly into synchronization. Further details of this procedure are defined in GSM specification 05.10.

There exists also a modified OTD scheme, which is known as Enhanced Observed Time Difference (E-OTD). In brief, the E-OTD positioning method is based on signal measurements made by the mobile station (MS) and location measurement units (LMUs), which are essentially stationary mobiles of known position. To calculate the position of the mobile, the network uses three parameters: observed time difference (OTD), real time difference (RTD), and geometric time difference (GTD). GTD is derived from OTD and RTD, and gives the mobile's position. The OTD measurements are time intervals measured by a mobile station MS between received signals originating from two different base stations. Because the GSM network is not synchronized, the network measures the RTD, which is the relative synchronization difference between the two base stations. To obtain accurate triangulation, OTD and RTD measurements of at least three geographically distinct base stations are needed. Based on the measured OTD and RTD values, the location of the MS can be calculated. The position of the MS is determined by deducing the geometrical components of the time delays (GTD) to a mobile station MS from the base stations.

E-OTD as a mobile station location method in GSM requires that the mobile is able to receive at least two neighboring base stations (in addition to the currently serving BTS). According to GSM specification 04.31, the mobile station can identify the neighbor BTS by using:
1) an index referring to the BTS listed in the Measure Position Request component,
2) an index referring to the BTS listed in the BCCH allocation list (System Information Neighbor Lists) of the serving BTS,
3) cell identity CI and location area code LAC,
4) base station identity code BSIC value and broadcast control channel BCCH carrier information,
5) 51-Multiframe offset and BCCH carrier. Correct identification of the neighbor base station is of outmost importance for successful and accurate location.

Nevertheless, there may arise situations in which the above listed measures will not be sufficient to properly identify a base transceiver station and/or transceiver device constituting the radio communication network without doubt.

Stated in other words, BSIC and BCCH carrier are not a unique way to identify a base station. Theoretically, a proper network planning should ensure that it is not possible for a mobile station to receive signals from two or more different base stations with the same BSIC and BCCH carrier combination, and that based on a serving base station it is evident, which neighbor base station (with a certain BSIC and BCCH carrier combination) the mobile has measured.

However, in reality it is possible that the same BSIC and BCCH carrier combination repeats itself so tightly (i.e. spatially close to each other within the network) that situations arise in which it is ambiguous (not clear) which neighbor base station was measured. Since mobile stations mainly use the information of BSIC and BCCH carrier for neighbor base station identification, there may arise a problem.

Likewise, when a neighbor base station is identified with a 51-Multiframe offset and BCCH carrier, the same problem can arise if a frequency reuse pattern is tight, and 51-Multiframe offsets happen to be the same.

In some cases it is also possible that two different base stations share the same cell identity CI and location area code LAC. This can happen if Inter-PLMN HO feature is in use (PLMN=Public Land Mobile Network, HO=Handover). Inter PLMN HO feature means basically that a base transceiver station BTS can have neighbor cells which belong to different countries and/or operators and MS can make a handover to those cells, as it is the case e.g. in international roaming near country borders.

FIG. 1 schematically illustrates such a situation. A serving BTS also referred to as reference BTS is not shown in FIG. 1. Rather, there is shown the mobile station MS trying to identify its surrounding base transceiver stations, i.e. potential neighbors BTS1, BTS2 to which e.g. a handover HO could be performed. As shown in FIG. 1, the mobile station MS receives identical information concerning the BSIC for the two base transceiver stations, i.e. BSIC1=BSIC2. Also, the BCCH information for BTS1 and BTS2 is identical (BCCH1=BCCH2), and also the offsets, i.e. 51-multiframe offsets offset1/offset2 are identical. In such a situation, it is evident that identifying said transceiver devices (when e.g. accomplished based on respective broadcast control channel BCCH information of said transceiver devices and/or on a respective base station identity code BSIC of said transceiver devices) leads to an ambiguous result since it is evident to be judged that the transceiver devices can no longer be distinguished from each other.

In addition to an identification problem, there can be situations, when the E-OTD value reported by the mobile station can be corrupted because the mobile station performs for some reason (e.g. bad radio environment) very poor measurements, or because for other reasons the measurement information from the mobile station is bad.

SUMMARY OF THE INVENTION

Hence, in view of the above situations, it is an object of the present invention to provide a method for identification of transceiver devices and for checking measurement values of an observed time difference which are respectively free from the above described drawbacks and problems.

According to the present invention, this object is for example achieved by a method for identification of transceiver devices constituting a radio communication network, said method comprising the steps of pre-identifying said transceiver devices, judging that there is an ambiguous result obtained in said pre-identification, and verifying said ambiguous result by identifying said transceiver devices based on real time difference RTD values between said transceiver devices.

According to advantageous further developments of said method,
  said pre-identifying is accomplished based on respective broadcast control channel BCCH information of said transceiver devices,
  said pre-identifying is (additionally or alternatively) accomplished based on a respective base station identity code BSIC of said transceiver devices,
  it is judged that there is an ambiguous result obtained in said pre-identification, if the transceiver devices can no longer be distinguished from each other,
  the transceiver devices can no longer be distinguished from each other if the respective BCCH information of said transceiver devices are identical.
  the transceiver devices can no longer be distinguished from each other, if (additionally or alternatively) the respective base station identity code BSIC of said transceiver devices are identical,
  said verifying is based on a relation between an observed time difference OTD at a mobile transceiver device, the real time difference RTD of transmission times between said transceiver devices constituting said radio communication network, and the geometric time difference GTD being due to different propagation times between the mobile transceiver device and the transceiver devices constituting said radio communication network, the relation being expressed as OTD=RTD+GTD,
  said verifying comprises estimating a minimum $GTD_{expected,min}$ and a maximum $GTD_{expected,max}$ value of said geometric time difference GTD, deriving, based on said observed time difference OTD and said estimated maximum and minimum geometric time difference GTD, a respective minimum $RTD_{expected,min}$ and a maximum $RTD_{expected,max}$ expected value of said real time difference RTD such that $RTD_{expected,min}=$ OTD−$GTD_{expected,max}$, $RTD_{expected,max}=$OTD−$GTD_{expected,min}$,
  said verifying further comprises comparing known real time difference RTD values of said transceiver devices with said range of expected real time difference values $RTD_{expected,min}$, $RTD_{expected,max}$, and if the real time difference value of the transceiver device is found to be within said range of expected real time difference values, identifying this transceiver device as an unambiguous neighbor transceiver device to a reference transceiver device.

Furthermore, according to the present invention the above object is for example achieved by a method for checking measurement values of an observed time difference OTD obtained at a mobile transceiver device operated within a radio communication network constituted by transceiver devices, wherein said checking is based on real time difference RTD values between said transceiver devices.

According to advantageous further developments of said method,
  said checking is based on a relation between an observed time difference OTD at a mobile transceiver device, the real time difference RTD of transmission times between said transceiver devices constituting said radio communication network, and the geometric time difference GTD being due to different propagation times between the mobile transceiver device and the transceiver devices constituting said radio communication network, the relation being expressed as OTD=RTD+GTD,
  said checking comprises estimating a minimum $GTD_{expected,min}$ and a maximum $GTD_{expected,max}$ value of said geometric time difference GTD, obtaining, based on said real time difference RTD and said estimated maximum and minimum geometric time difference GTD, a respective minimum $OTD_{expected,min}$ and a maximum $OTD_{expected,max}$ expected value of said observed time difference OTD such that $OTD_{expected,min}=$RTD+$GTD_{expected,max}$, $OTD_{expected,max}=$RTD+$GTD_{expected,min}$,
  said checking further comprises comparing measured observed time difference OTD values with said range of expected observed time difference values $OTD_{expected,min}$, $OTD_{expected,max}$, and if the observed time difference value at the mobile transceiver device is found to be within said range of expected observed time difference values, this measurement value is accepted, while otherwise it is rejected.

Further, according to advantageous further developments of both of the above mentioned methods,
  1. said estimation of maximum and minimum geometric time difference GTD is based on information about the location of the mobile transceiver device already available in the communication network,
2. said already available information about the location of the mobile transceiver device is obtained, in GSM communication systems, using Cell Identity CI and/or Cell Identity CI and Timing Advance TA values of the mobile transceiver device, and, in UMTS communication systems, using Cell Identity (CI) and/or Cell Identity CI and Service Area Identifier SAI and/or Round Trip Time (RTT) values,
3. said estimation of maximum and minimum geometric time difference $GTD_{max}$, $GTD_{min}$ further comprises setting the maximum GTD value $GTD_{max}$ equal to the distance between the two transceiver devices divided by the speed of radio waves, and setting the minimum GTD value $GTD_{min}$ equal to the negative of the distance between the two transceiver devices divided by the speed of radio waves,
4. said estimation of maximum and minimum geometric time difference $GTD_{max}$, $GTD_{min}$ further comprises performing the estimation as stated in the item 1 or 2 above, performing the estimation as stated in the item 3 above, and selecting for the maximum $GTD_{max}$ the value of the estimates obtained in the two steps above which is smaller, and selecting for the minimum $GTD_{min}$ the value of the estimates obtained in the two steps above which is larger.

Also, according to the present invention, the above object is achieved by a device for identification of transceiver devices constituting a radio communication network, the device being adapted to carry out the method according to any of the previously described method aspects, as well as by a device for checking measurement values of an observed time difference OTD obtained at a mobile transceiver device operated within a radio communication network constituted by transceiver devices, the device being adapted to carry out the method according to any of the previously described method aspects.

Accordingly, by virtue of the present invention being implemented the following advantages can be achieved:
easy implementation in existing products can be realized,
possible to implement without any standards changes,
no hardware changes needed,
a solution for base station identity ambiguity problem with enhanced performance due to "sanity" checks of measurement values.

Thus, the present invention offers an improved method for mobile station location determination and/or for taking handover decisions as well as a way of verifying the reliability of obtained measurement results.

The above and further objects, features, and advantages of the present invention will be more readily understood upon referring to the accompanying drawings in conjunction with the subsequent description.

DETAILED DESCRIPTION OF THE EMBODIMENTS

Figure 1:
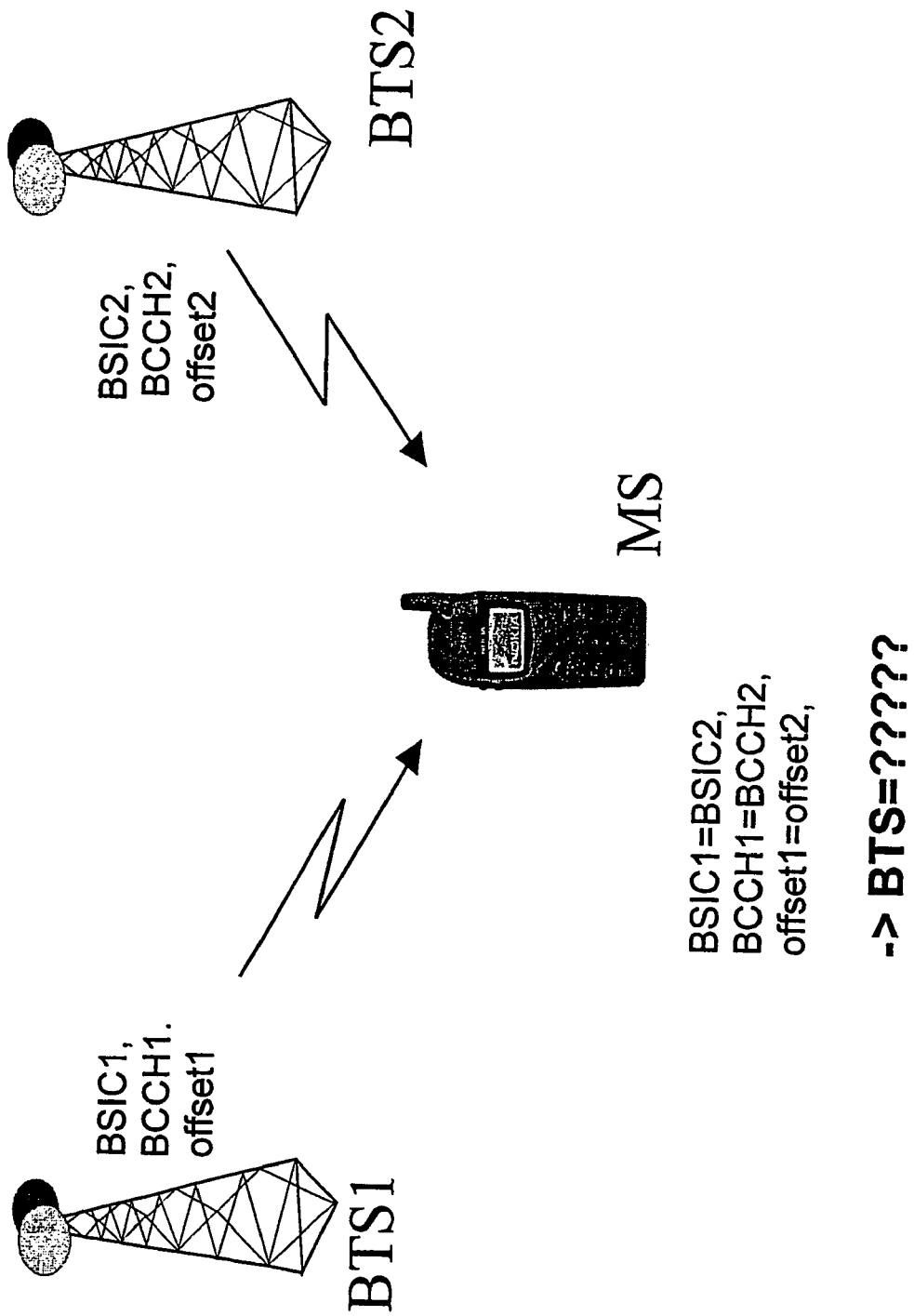
FIG. 1 illustrates a situation in a radio communication network in which no unambiguous identification of base transceiver stations is possible based on BSIC and/or BCCH and/or 51-multiframe offset information.

The present invention is subsequently described in detail with regard to the accompanying drawings.

According to the present invention, it is proposed that the Real Time Difference (RTD) values that describe the transmission time differences between base stations, and that are needed for E-OTD location, will be used on one hand to distinguish between ambiguous identification parameters, and on the other hand to perform sanity checks (reliability checks) for reported measurements.

For example, a Serving Mobile Location Center (SMLC) as a network node which receives E-OTD measurements from the mobile station, knows RTD values, and calculates location estimates. Thus, the SMLC can easily also use RTD values according to the proposed method. The SMLC may be a separate network node or be part of e.g. a base station controller, a mobile services switching center or the like, as long as its required functionality is implemented.

Nevertheless, the required functionality could e.g. also implemented in the mobile station MS itself provided that the necessary data such as RTD are supplied thereto.

Basically, in connection with E-OTD location, the mobile station (MS) either reports Observed Time Difference (OTD) measurement results to the Serving Mobile Location Center SMLC, or, alternatively, the mobile can use measurements itself to calculate its own position. This has been specified in GSM standards (e.g. Location Services Stage 2 description GSM 03.71).

The well-known equation relating OTD and RTD is:

$$OTD=RTD+GTD \quad (1)$$

where OTD is the measured Observed Time Difference between the arrivals of signals from the reference base station (BTS) and the neighbor base station. OTD refers thus to a pair of base stations comprising the reference base station (e.g. the currently serving base station for the mobile station) and a potential neighbor base station. RTD is the Real Time Difference, i.e. the transmission time difference between the base station pair (reference and neighbor) in question. Geometric Time Difference (GTD) is due to different propagation times (different distances) between the mobile and two base stations. GTD includes actual information about location:

$$GTD=[d(MS,BTS1)-d(MS,BTS2)]/c \quad (2)$$

where d(MS, BTSx) is the distance between the MS and the BTSx, and c is the speed of radio waves. (It is to be noted that in FIGS. 2 and 3 a neighbor base transceiver station BTS is denoted by BTS_A, while a reference base transceiver station is denoted by BTS_B.)

Solving Base Station Ambiguity

According to the present invention, in order to solve an ambiguous situation in which the identities of base stations can not be determined on the basis of e.g.

BSIC/BCCH etc., an estimate of the value of GTD, $GTD_{expected}$, is formed. It will normally be a range, i.e. it consists of a minimum $GTD_{expected,min}$ and maximum value $GTD_{expected,max}$, as subsequently explained.

Determination of Expected GTD

One way to estimate the expected GTD comes from the fact that the magnitude of GTD (in distance units, e.g. multiplied by speed of radio waves) can not be larger than the distance between the reference and neighbor base stations. This is obvious from equation (2) above and geometry.

Figure 2:
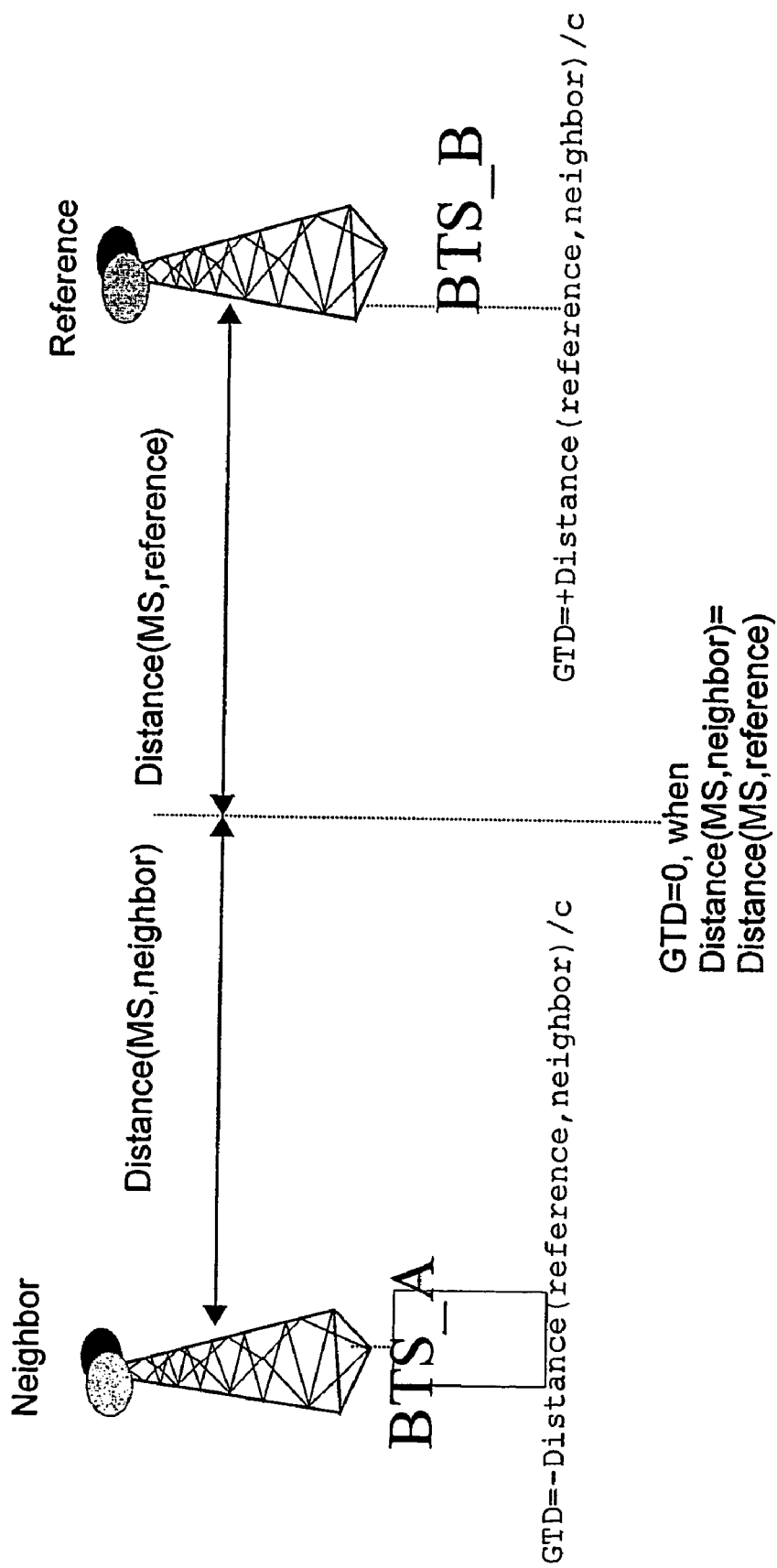
FIG. 2 illustrates a basic arrangement for explaining the estimation of an expected maximum/minimum GTD value.

FIG. 2 shows an example situation for determining the minimum and maximum value of $GTD_{expected}$. In FIG. 2 it is assumed that the base transceiver stations BTS_A (reference) and BTS_B (neighbor) have a "straight" radio path between them and that the mobile station MS has a position somewhere on this straight radio path "line of sight".

So, if the mobile station is exactly in the middle between the two base transceiver stations, then GTD=0, since the mobile station receives the signals transmitted from the base stations simultaneously (under the assumption that BTS_A, BTS_B transmit synchronously). If, however, the mobile station is at the position of the base station BTS_A (neighbor), the GTD is a minimum (negative value), while if the mobile station is at the position of the base station BTS_B (reference), the GTD is a maximum (positive value).

Note that the signs depend on definition of GTD, and in FIG. 2, GTD is assumed to be defined as

[d(MS,neighbor)−d(MS,reference)]/c.

Thus one way to set $GTD_{expected}$ is $GTD_{expected,min}$=−distance(referenceBTS, neighborBTS)/c and $GTD_{expected,max}$=distance(referenceBTS, neighborBTS)/c.

Figure 3:
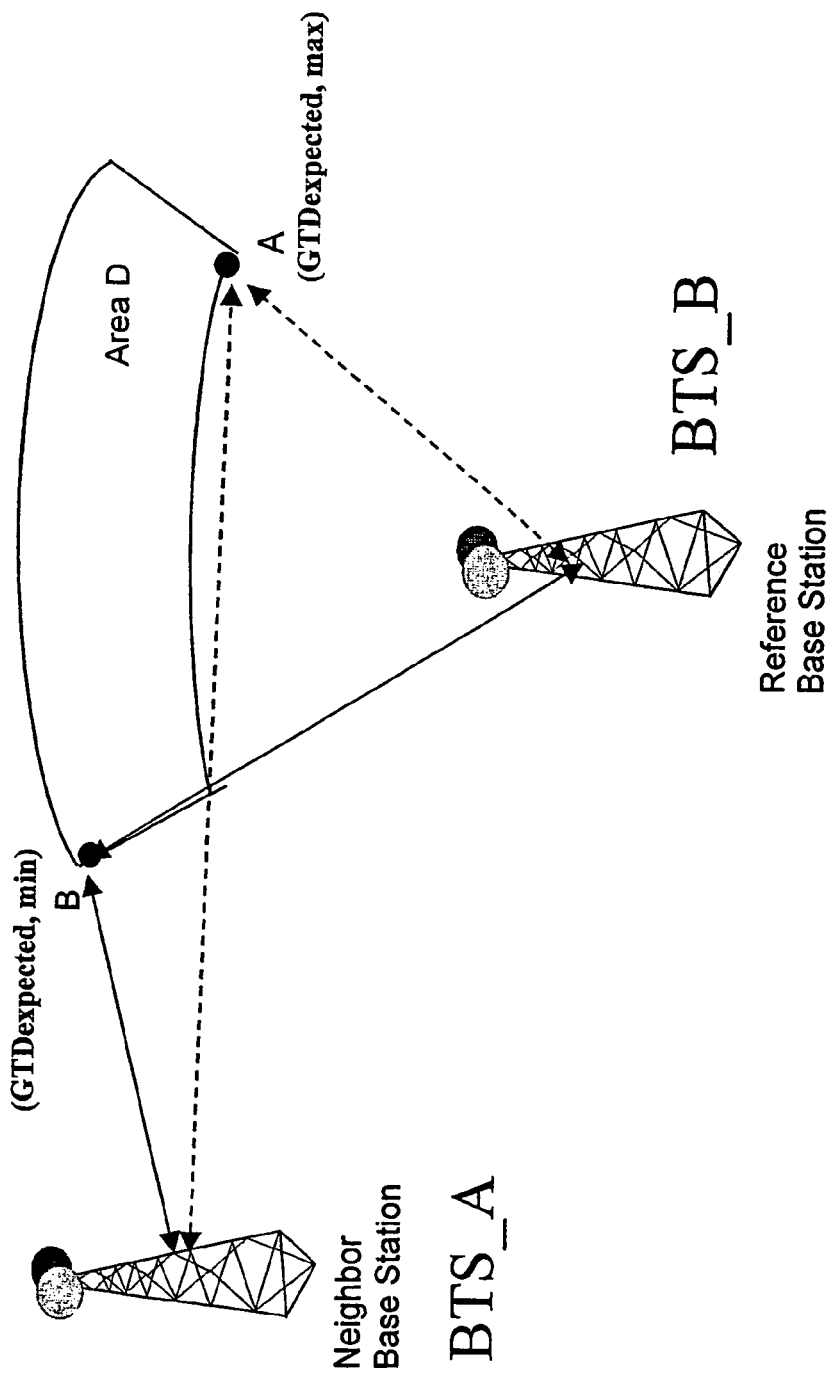
FIG. 3 shows a modified arrangement for explaining the estimation of an expected maximum/minimum GTD value.

A further approach for determination of minimum and maximum values of $GTD_{expected}$ is illustrated in FIG. 3. This approach is based on that according to GSM specifications, in each location services transaction, an initial location estimate is obtained based on Cell Identity CI and/or Timing Advance TA (see e.g. GSM 03.71). That is, an initial estimate may be obtained based on CI alone or on CI and TA in combination. When the initial estimate with its related confidence area are known, it can be used to estimate GTD even more accurately. In third generation UMTS systems, Cell Identity (CI) and/or Service Area Identifier (SAI) and/or Round Trip Time (RTT) values can be used similarly. That is, CI, and/or CI and SAI, and/or CI and SAI and RTT, and/or CI and RTT can be used. Just as an example, the term location services transaction as used herein refers to a normal GSM location services event, which can be a Mobile-Terminated Location Request (MT-LR), Mobile-Originated Location Request (MO-LR), or Network-Induced Location Request (NI-LR) (e.g. in LCS system description GSM 03.71).

It is assumed that as shown in FIG. 3, the initial location estimate and its confidence area define an area D where the mobile station MS (not shown in FIG. 3) is with a certain probability level x. Then minimum and maximum values of $GTD_{expected}$ can be found at those points within the area D, where the signed distance difference to the reference and neighbor base stations is minimum and maximum, respectively.

In the example of FIG. 3, $GTD_{expected,max}$ can be found in the point A, i.e. there [d(XY,neighbor)−d(XY,reference)]/c has its maximum value, when restricting the point XY to be within the boundaries of the area D. Correspondingly, $GTD_{expected,min}$ can be found in the point B. It is to be noted that above a point XY is intended to define a location by its coordinates x, y, so that point A is defined as $x_A$, $y_A$, and point B as $x_B$, $y_B$.

It is also possible to perform and combine both estimations as described in FIGS. 2 and 3. Then, for estimate of the minimum GTD, there can be selected the value that is larger (i.e. has smaller absolute value) of the two minimum GTD estimates. Correspondingly, for estimate of the maximum GTD, there can be selected the value that is smaller of the two maximum GTD estimates. This leads to a smallest interval between $GTD_{min}$ and $GTD_{max}$ being estimated for use in the further processing.

Herein before, different ways to obtain the expected GTD value range have been described. Once the interval of expected GTD values is obtained, these can be used according to the present invention in order to solve an ambiguous base station identification.

To this end, using the measured OTD value and equation (1), an expected RTD value, $RTD_{expected}$, is calculated. Again it will be usually be a range of values with minimum $RTD_{expected,min}$ and maximum $RTD_{expected,max}$.

$$RTD_{expected,min} = OTD - GTD_{expected,max} \quad (3)$$

$$RTD_{expected,max} = OTD - GTD_{expected,min} \quad (4)$$

For identification purposes, the expected RTD range is compared with the known RTD values (i.e. those known by the network and/or the SMLC entity).

Let's consider a situation, when a neighbor base station is identified with BSIC and BCCH carrier combination, but due to too tight frequency reuse, there are two possible base stations with the same BSIC and BCCH carrier combination (as explained above in connection with FIG. 1). Stated in other words, according to the method for identification of transceiver devices constituting a radio communication network, said transceiver devices are pre-identified based on BSIC and/or BCCH information, and it is judged that there is an ambiguous result obtained in said pre-identification.

Then, further according to the present invention, the expected RTD range is formed $[RTD_{expected,min} \ldots RTD_{expected,max}]$, for both possible (neighbor) base stations, and it is checked whose real RTD value is within the range.

More precisely, an expected RTD range is formed for each potential neighbor base station or for one of them in relation to the reference base station (currently serving BTS). Then, the real RTD values are compared to the RTD range, in order to determined, whether one of the RTD values of the neighbor base stations is within the range.

If one of them is, then that's the right base station. If both are, then the ambiguity can not be solved (it is possible that the two base stations have almost the same RTD value relative to the reference base station). However, the probability for this situation is not too high.

Sanity Check

Furthermore, performing a sanity check for the measured OTD value can be done again by forming $GTD_{expected,min}$ and $GTD_{expected,max}$.

Then by knowing the real RTD value, an expected OTD range is formed:

$$OTD_{expected,min} = RTD + GTD_{expected,min} \quad (5)$$

$$OTD_{expected,max} = RTD + GTD_{expected,max} \quad (6)$$

If the measured OTD value is within the range $[OTD_{expected,min} \ldots OTD_{expected,max}]$, it can be concluded that the measurement is correct, otherwise the measurement result is rejected.

It is to be noted that RTD values can be determined by using measurements from Location Measurement Units LMU. LMUs report their (actually OTD) measurements to the SMLC, that calculates the RTD values and maintains them. SMLCs can also exchange RTD information between each other. GSM Location Services LCS specifications allow the SMLC to request the LMUs to report periodically, or when the measurement values have changed by more than a certain limit. Thus it is possible for the SMLC to know all the time the RTD values in the network.

Furthermore, it is to be noted that a knowledge of the area D (FIG. 3) can be derived based on available information (already known in the network) about the location of the mobile transceiver device and the uncertainty of the location. For example in GSM, in connection with a location transaction, Cell Identity CI and Timing Advance TA values are known. Based on them an arc (like in FIG. 3) can be defined inside which the MS is present with a certain probability. Basically it is possible to apply any of the well known mathematical approaches for finding a minimum and maximum value for a function (in this case the function is GTD=[distance(XY, BTS1)−distance(XY, BTS2)]/c, where XY is a point) with certain limits set for the variable of the function (in this case XY as the expected location).

For example, if the BTSs are outside the area D, then the minimum and maximum are found at the boundary of the area D. In the case when the area D is obtained using CI and/or CI and TA, there are well defined definitions for the boundaries. Then we set the point XY to be on the boundary and find the points XY where GTD gets its maximum and minimum values (A and B in FIG. 3, respectively). The point XY, i.e. A and B in FIG. 3, respectively, where this maximum and minimum values are found can be called maximum and minimum. If one or both of the BTSs are in the area D, then the finding of minimum and maximum for GTD is basically the same, except that now XY can also be inside the area. A brute-force approach can be just to divide the area D into a grid and then go through each point XY to find minimum and maximum.

Although herein above the present invention has mainly been described with reference to the method, it is to be understood that of course also correspondingly adapted devices are concerned by the present invention. That is, the present invention also concerns a device for identification of transceiver devices constituting a radio communication network, the device being adapted to carry out the method according to any of the previously described method aspects, as well as a device for checking measurement values of an observed time difference OTD obtained at a mobile transceiver device operated within a radio communication network constituted by transceiver devices, the device being adapted to carry out the method according to any of the previously described method aspects.

Accordingly, as has been described above, the present invention concerns a method for identification of transceiver devices BTS_A, BTS_B constituting a radio communication network, said method comprising the steps of pre-identifying said transceiver devices, judging that there is an ambiguous result obtained in said pre-identification, and verifying said ambiguous result by identifying said transceiver devices based on real time difference RTD values between said transceiver devices. Also, the present invention concerns a method for checking measurement values of an observed time difference OTD obtained at a mobile transceiver device operated within a radio communication network constituted by transceiver devices, wherein said checking is based on real time difference RTD values between said transceiver devices. Thus, the present invention offers an improved method for mobile station location determination and/or for taking handover decisions as well as a way of verifying the reliability of obtained measurement results.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method for identification of transceiver devices constituting a radio communication network, said method comprising
pre-identifying said transceiver devices,
judging that there is an ambiguous result obtained in said pre-identification, and
verifying said ambiguous result by identifying said transceiver devices based on real time difference values between said transceiver devices.

2. A method according to claim 1, wherein
said pre-identifying is accomplished based on respective broadcast control channel broadcast control channel information of said transceiver devices.

3. A method according to claim 1, wherein
said pre-identifying is accomplished based on a respective base station identity code of said transceiver devices.

4. A method according to claim 1, wherein
it is judged that there is an ambiguous result obtained in said pre-identification, if the transceiver devices can no longer be distinguished from each other.

5. A method according to claim 4, wherein
the transceiver devices can no longer be distinguished from each other if the respective broadcast control channel information of said transceiver devices are identical.

6. A method according to claim 4, wherein
the transceiver devices can no longer be distinguished from each other, if the respective base station identity code of said transceiver devices are identical.

7. A method according to claim 1, wherein
said verifying is based on a relation between
an observed time difference OTD at a mobile transceiver device,
the real time difference RTD of transmission times between said transceiver devices constituting said radio communication network, and
the geometric time difference GTD being due to different propagation times between the mobile transceiver device and the transceiver devices constituting said radio communication network, the relation being expressed as $$OTD=RTD+GTD.$$

8. A method according to claim 7, wherein
said verifying comprises
estimating a minimum $GTD_{expected,min}$ and a maximum $GTD_{expected,max}$ value of said geometric time difference GTD,
deriving, based on said observed time difference OTD and said estimated maximum and minimum geometric time difference GTD, a respective minimum $RTD_{expected,min}$ and a maximum $RTD_{expected,max}$ expected value of said real time difference RTD such that $$RTD_{expected,min}=OTD-GTD_{expected,max}$$

$$RTD_{expected,max}=OTD-GTD_{expected,min}.$$

9. A method according to claim 8, wherein
said verifying further comprises
comparing known real time difference values of said transceiver devices with said range of expected real time difference values $RTD_{expected,min}$, $RTD_{expected,max}$, and if the real time difference value of the transceiver device is found to be within said range of expected real time difference values, identifying this transceiver device as an unambiguous neighbor transceiver device to a reference transceiver device.

10. A method according to claim 8, wherein
said estimation of maximum and minimum geometric time difference is based on information about the location of the mobile transceiver device already available in the communication network.

11. A method according to claim 10, wherein
said already available information about the location of the mobile transceiver device is obtained, in Global System for Mobile communication systems, using Cell Identity and/or Cell Identity and Timing Advance values of the mobile transceiver device, and, in Universal Mobile telecommunication systems, using Cell Identity and/or Cell Identity and Service Area Identifier and/or Round Trip Time values.

12. A method according to claim 8, wherein
said estimation of maximum and minimum geometric time difference $GTD_{max}$, $GTD_{min}$ further comprises
setting the maximum GTD value $GTD_{max}$ equal to the distance between the two transceiver devices divided by the speed of radio waves, and
setting the minimum GTD value $GTD_{min}$ equal to the negative of the distance between the two transceiver devices divided by the speed of radio waves.

13. A method according to claim 8, wherein
said estimation of maximum and minimum geometric time difference $GTD_{max}$, $GTD_{min}$ further comprises
estimating maximum and minimum geometric time difference based upon information about the location of a mobile transceiver device already available in the communication network;
estimating maximum and minimum geometric time difference by setting the maximum GTD value $GTD_{max}$ equal to the distance between the two transceiver devices divided by the speed of radio waves, and setting the minimum GTD value $GTD_{min}$ equal to the negative of the distance between the two transceiver devices divided by the speed of the radio waves, and
selecting for the maximum $GTD_{max}$ the value of the estimates obtained in the two steps above which is smaller, and
selecting for the minimum $GTD_{min}$ the value of the estimates obtained in the two steps above which is larger.

14. The method according to claim 1, further comprising checking measurement values of an observed time difference obtained at a mobile transceiver device operated within a radio communication network constituted by transceiver devices, wherein
said checking is based on real time difference values between said transceiver devices.

15. A method according to claim 14, wherein
said checking is based on a relation between
an observed time difference OTD at a mobile transceiver device,
the real time difference RTD of transmission times between said transceiver devices constituting said radio communication network, and
the geometric time difference GTD being due to different propagation times between the mobile transceiver device and the transceiver devices constituting said radio communication network, the relation being expressed as $$OTD=RTD+GTD.$$

16. A method according to claim 15, wherein
said checking comprises
estimating a minimum $GTD_{expected,min}$ and a maximum $GTD_{expected,max}$ value of said geometric time difference,
obtaining, based on said real time difference and said estimated maximum and minimum geometric time difference, a respective minimum $OTD_{expected,min}$ and a maximum $OTD_{expected,max}$ expected value of said observed time difference such that $$OTD_{expected,min}=RTD+GTD_{expected,max}$$

$$OTD_{expected,max}=RTD+GTD_{expected,min}.$$

17. A method according to claim 16, wherein
said checking further comprises
comparing measured observed time difference values with said range of expected observed time difference values $OTD_{expected,min}$, $OTD_{expected,max}$, and
if the observed time difference value at the mobile transceiver device is found to be within said range of expected observed time difference values, this measurement value is accepted, while otherwise it is rejected.

18. A device for identification of transceiver devices constituting a radio communication network, the device configured to:
pre-identify said transceiver devices;
judge that there is an ambiguous result obtained at said pre-identification; and
verify said ambiguous result by identifying said transceiver devices based on real time difference values between said transceiver devices.

19. The device according to claim 18, further configured to check measurement values of an observed time difference obtained at a mobile transceiver device operated within a radio communication network constituted by transceiver devices, the device comprising a checking unit configured to perform a check based on real time difference values between said transceiver devices.

20. A device for identification of transceiver devices, comprising
means for pre-identifying transceiver devices in a radio network;
means for judging that there is an ambiguous result obtained in a pre-identifying process; and
means for verifying the ambiguous result by identifying the transceiver devices based on real time difference values between the transceiver devices.

21. The device according to claim 20, further comprising:
a checking means for performing a check based on real time difference values between at least two transceiver devices,
wherein an observed time difference is obtained at a mobile transceiver device operated within a radio communication network constituted by transceiver devices.

* * * * *